United States Patent
Hu et al.

(10) Patent No.: US 9,300,808 B2
(45) Date of Patent: *Mar. 29, 2016

(54) METHOD AND SYSTEM FOR INTEROPERATION BETWEEN MULTIPLE CONFERENCE SYSTEMS

(71) Applicant: Huawei Technologies Co., Ltd., Shenzhen (CN)

(72) Inventors: Yun Hu, Brussels (BE); Yonggang Tang, Shenzhen (CN); Bingkeng Peng, Shenzhen (CN)

(73) Assignee: Huawei Techologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/808,944

(22) Filed: Jul. 24, 2015

(65) Prior Publication Data

US 2015/0334243 A1    Nov. 19, 2015

Related U.S. Application Data

(63) Continuation of application No. 14/188,246, filed on Feb. 24, 2014, now Pat. No. 9,124,706, which is a continuation of application No. PCT/CN2011/081973, filed on Nov. 9, 2011.

(51) Int. Cl.
   *H04M 3/42* (2006.01)
   *H04M 3/56* (2006.01)
   (Continued)

(52) U.S. Cl.
   CPC ............ *H04M 3/562* (2013.01); *H04L 12/1818* (2013.01); *H04L 63/08* (2013.01);
   (Continued)

(58) Field of Classification Search
   CPC ................. H04M 2203/5009; H04M 2203/50; H04M 3/56; H04M 2203/5045
   USPC ............. 379/202.01, 201.01, 203.01, 204.01; 455/416; 715/756; 348/14.07
   See application file for complete search history.

(56) References Cited

U.S. PATENT DOCUMENTS

| 5,973,724 A | * | 10/1999 | Riddle ................ H04L 12/1822 348/14.07 |
| 2009/0089683 A1 | * | 4/2009 | Thapa ..................... H04N 7/15 715/756 |
| 2009/0154659 A1 | | 6/2009 | Morin |

FOREIGN PATENT DOCUMENTS

| CN | 101588253 A | 11/2009 |
| CN | 101631173 A | 1/2010 |

(Continued)

OTHER PUBLICATIONS

"Series H: Audiovisual and Multimedia Systems; Infrastructure of audiovisual services—Systems and terminal equipment for audiovisual services; Packet-based multimedia communications systems," Telecommunication Standardization Sector of ITU, H.323, International Telecommunication Union, Geneva, Switzerland (Dec. 2009).

(Continued)

*Primary Examiner* — Thjuan K Addy
(74) *Attorney, Agent, or Firm* — Leydig, Voit & Mayer, Ltd.

(57) ABSTRACT

Embodiments of the present disclosure provide a method for interoperation between multiple conference systems. In the method, a first conference system sends a call request message, which includes conference authentication information of a second conference created by a second conference system, to a second conference system for authentication. After the authentication is passed, the first conference system joins the second conference as a participant, where a type of the participant is a conference.

20 Claims, 5 Drawing Sheets

(51) Int. Cl.
*H04L 29/06* (2006.01)
*H04L 12/18* (2006.01)
*H04M 3/38* (2006.01)

(52) U.S. Cl.
CPC .......... *H04L65/1069* (2013.01); *H04L 65/403* (2013.01); *H04M 3/382* (2013.01); *H04M 3/56* (2013.01); *H04M 2203/5009* (2013.01)

(56) References Cited

FOREIGN PATENT DOCUMENTS

| CN | 101883105 A | 11/2010 |
|---|---|---|
| WO | WO 2008033706 A1 | 3/2008 |
| WO | WO 2011137284 A2 | 11/2011 |

OTHER PUBLICATIONS

Freed et al., "Multipurpose Internet Mail Extensions (MIME) Part Two: Media Types," Network Working Group, Request for Comments 2046, pp. 1-44 (Nov. 1996).

Rosenberg, "A Framework for Conferencing with the Session Initiation Protocol (SIP)," Network Working Group, Request for Comments: 4353, pp. 1-29, Internet Society, Reston, Virginia (Feb. 2006).

Johnston et al., "Session Initiation Protocol (SIP), Call Control—Conferencing for User Agents," Network Working Group, Request for Comments: 4579, pp. 1-43, Internet Society, Reston, Virginia (Aug. 2006).

Romano et al., "Requirements for Distributed Conferencing," Network Working Group, pp. 1-10, Internet Society, Reston, Virginia (Dec. 10, 2008).

\* cited by examiner

METHOD AND SYSTEM FOR INTEROPERATION BETWEEN MULTIPLE CONFERENCE SYSTEMS

CROSS-REFERENCE TO RELATED APPLICATION

This application is a continuation of U.S. patent application Ser. No. 14/188,246, filed on Feb. 24, 2014, which is a continuation of International Patent Application No. PCT/CN2011/081973, filed on Nov. 9, 2011. The afore-mentioned patent applications are hereby incorporated by reference in their entireties.

TECHNICAL FIELD

The present disclosure relates to the field of communication technologies, and in particular, to methods and systems for interoperation between multiple conference systems.

BACKGROUND

With rapid development of the global economy, scales of various corporations and organizations witness daily growth, service regions undergo constant expansion, and this boosts a demand for communication and coordination inside and outside an enterprise. Under this multi-party coordination demand, a conference system has gradually become a basic tool in daily work of the enterprise and individuals.

Furthermore, with popularization of conference services, not only more and more enterprises have constructed or are constructing a dedicated network conference system, but also more and more operators are also constructing a conference system to provide conference services for enterprise users and individual users. The users have a strong demand for interoperation between these conference systems, which is also an inevitable trend in the industry.

In the prior art, interoperation between multiple conference systems may be implemented by directly accessing, through a terminal of a conference system, another conference system, or simulated access of the conference systems is implemented by adding an additional terminal. Therefore, the requirement on the terminal is high.

SUMMARY

A brief overview about the present disclosure is given below, so as to provide basic understandings of certain aspects of the present disclosure. It should be understood that, this overview is not an exhaustive overview about the present disclosure. It is neither intended to determine a key or important part of the present disclosure, nor intended to limit the scope of the present disclosure. It merely aims to give certain concepts in a simplified form, and these concepts are taken as the foreword of a more detailed description discussed later.

According to an aspect of an embodiment of the present disclosure, a method for interoperation between multiple conference systems is provided, including:

sending, by a first conference system, a call request message to a second conference system, where the call request message includes conference authentication information of the second conference system, to enable the second conference system to authenticate the first conference system according to the conference authentication information; and after the authentication is passed, joining, by the first conference system, the second conference system as a participant, where a type of the participant is a conference.

According to another aspect of an embodiment of the present disclosure, a conference system is provided, including:

a sending unit, configured to send a call request message to a second conference system, where the call request message includes conference authentication information of the second conference system, to enable the second conference system to authenticate the conference system according to the conference authentication information; and a conference service apparatus, configured to add, after the authentication is passed, the conference system into the second conference system as a participant, where a type of the participant is a conference.

In the technical solutions provided in the embodiments of the present disclosure, a first conference system sends a call request message to a second conference system, where the call request message includes conference authentication information of the second conference system, to enable the second conference system to authenticate the first conference system according to the conference authentication information; and after the authentication is passed, the first conference system may join the second conference system as a participant, and in this case, a type of the participant is a conference. Therefore, in the embodiments of the present disclosure, the first conference system joins the second conference system as a participant, thereby implementing interoperation between the first conference system and the second conference system and imposing no additional requirement on a terminal.

BRIEF DESCRIPTION OF DRAWINGS

To illustrate the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Exemplary embodiments of the present disclosure are described with reference to accompanying drawings below.

For clarity and brevity, not all characteristics of actual implementation manners are described in the specification. However, it should be understood that, in the process for developing any actual embodiment of this type, lots of decisions specific to the implementation manners have to be made, so as to achieve a specific target of a developer, and these decisions may vary with the implementation manners.

Generally, a conference contains a plurality of participants, and these participants can be divided into two types: one type being a conference moderator; and the other type being an ordinary participant (conference guest).

The conference moderator is a special participant in the conference, and the conference moderator can manage and control the conference where the conference moderator is located, such as locking the conference, prolonging the conference, and closing the conference. The conference moderator can also manage and control all participants in the conference, such as inviting a participant, hanging up on a participant, and performing muting on a participant or canceling the muting. Generally, only one conference moderator exists in one conference.

The conference guests are participants other than the conference moderator in the conference. The conference guests generally only have some basic conference control functions. A conference guest is only capable of performing an operation on the conference guest itself, but is incapable of performing any operation on other participants.

In the embodiments of the present disclosure, this situation is expanded, and the type of a participant can be a conference, which indicates that a conference system can join another conference system as a participant.

The embodiments of the present disclosure provide a solution, in which a conference system is supported to simulate itself into a participant, initiate a call to attend a conference of another conference system, and pass authentication of a peer conference system, thereby implementing interoperation (which may also be called bridging) between two conference systems. Both of the conference systems regard the peer conference system as a participant of this conference system.

Figure 1:
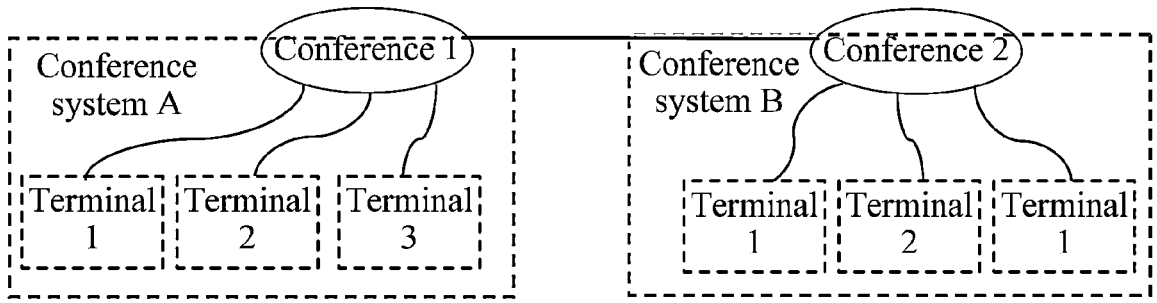
FIG. 1 is a schematic structural diagram of interoperation between multiple conference systems according to an embodiment of the present disclosure.

As shown in FIG. 1, a conference system A and a conference system B are taken as an example for illustration. For example, the conference system A convenes a conference 1, and the conference system B convenes a conference 2. The conference 1 simulates itself into a terminal, initiates a call to attend the conference 2, and becomes a participant of the conference 2. In this case, the conference 2 is also a participant of the conference 1. Media interoperation is directly performed between the conference 1 and the conference 2, and all participants of the conference 1 can hear voices of participants of the conference 2, and see videos of the participants of the conference 2.

In the embodiment of the present disclosure, no explicit distinction is made between a conference system and a conference convened by the conference system. That is to say, the aforementioned procedure may also be understood as follows: the conference system A simulates itself into a terminal, initiates a call to join the conference system B, and becomes a participant of the conference system B. In this case, the conference system B is also a participant of the conference system A. Media interoperation is performed between the conference system A and the conference system B.

An embodiment of the present disclosure provides a method for implementing interoperation between multiple conference systems. Interoperation between two conference systems is taken as an example for illustration, as shown in FIG. 2.

It should be noted that, before the method in this embodiment is executed, a conference moderator has created a conference. For example, a scheduled conference or an instant conference may have been created. The instant conference refers to a conference created by the conference moderator to begin immediately, and a participant can access the conference at once. The scheduled conference refers to a conference scheduled by the conference moderator to begin in the future, the conference is created by a conference system automatically at the start time when the conference is scheduled, and later a participant can access the conference.

Figure 2:
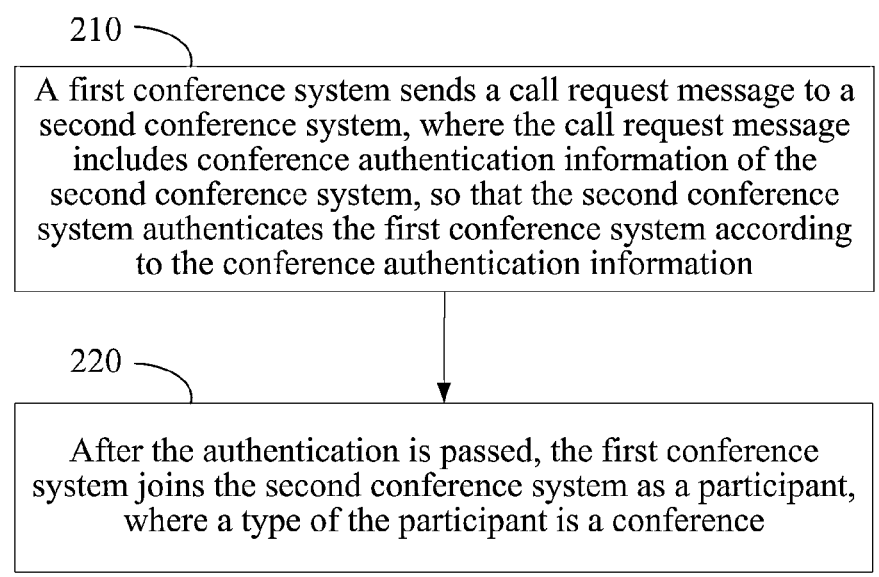
FIG. 2 is a flow chart of a method for interoperation between multiple conference systems according to an embodiment of the present disclosure.

After a conference is created, it can be seen from FIG. 2 that, the method according to the embodiment of the present disclosure includes:

Step 210: A first conference system sends a call request message to a second conference system, where the call request message includes conference authentication information of the second conference system, so that the second conference system authenticates the first conference system according to the conference authentication information.

The conference authentication information may include information such as a conference identity (ID), a conference password, or a token.

Certainly, the conference authentication information may also vary with specific implementation of the peer conference system. For example, a conference system takes the conference ID as a number that can be directly dialed; and in this case, when the first conference system calls the second conference system, the called number is an access number of the second conference, and the carried conference authentication information needs to contain only the conference password. Certainly, the conference authentication information may also include the conference ID and the password.

A moderator of the first conference system needs to understand the conference authentication information of the second conference system in advance.

The call request message is a message at a signaling layer.

Certainly and alternatively, the call request message may further carry conference authentication information of the first conference system, so that the second conference system initiates an authentication request to the first conference system according to the conference authentication information of the first conference system.

Step 220: After the authentication is passed, the first conference system joins the second conference system as a participant, where a type of the participant is a conference.

One conference system joins the other conference system, so the type of the participant can be a conference.

Alternatively, the call request message may further carry access information of the first conference system, and the second conference system accesses a conference control interface of the first conference system according to the access information of the first conference system. The first conference system receives an access request that is sent by the second conference system according to the access information and provides a conference control interface, namely, an operating interface for controlling a conference, for the second conference system.

Certainly, the access information of the first conference system may also be pre-configured on the second conference system, and the second conference system may access the conference control interface of the first conference system according to the pre-configured access information of the first conference system. The first conference system receives an access request from the second conference system and provides a conference control interface, namely, an operating interface for controlling a conference, for the second conference system.

The access information of the first conference system may include: an access path of the conference control interface of the first conference system.

Alternatively, the first conference system may further receive a call response message sent by the second conference system, where the call response message may carry access information of the second conference system. The first conference system may access a conference control interface of the second conference system according to the access information of the second conference system and perform conference control over the second conference system.

Certainly, access information of the second conference system may also be pre-configured on the first conference system, and the first conference system may access the conference control interface of the second conference system according to the access information of the second conference system and perform conference control over the second conference system.

The access information of the second conference system includes: an access path of the conference control interface of the second conference system.

Alternatively, the call response message may further carry a conference name of the second conference system or a language type of the second conference system.

When the call response message includes the conference name of the second conference system, and the first conference system adds the second conference system into a conference as a participant, a name for identifying the participant may be the conference name of the second conference system.

When the call response message includes the language type of the second conference system, and the first conference system adds the second conference system into a conference as a participant, a language used for playing a conference alert tone to the participant may be a language indicated by the language type of the second conference system.

Therefore, in the embodiment of the present disclosure, the first conference system joins the second conference system as a participant, thereby implementing interoperation between the first conference system and the second conference system and imposing no additional requirement on a terminal.

In the embodiment of the present disclosure, not only interoperation between two or more conferences is implemented, but also inter-control between these conferences is supported. A moderator of any conference can identify which participant type is a conference in a current conference and can click on the conference control interface of the current conference to open conference control interfaces of other conferences and control the other conferences. Furthermore, alternatively, the moderator does not need to log in once again.

Furthermore, in the embodiment of the present disclosure, audio or video media stream interoperation between two conferences can be implemented in need of only one call and without increasing bandwidth resources used for interoperation between multiple conference systems no matter how many participants accessing each conference. Therefore, in the embodiment of the present disclosure, a large number of bandwidth resources can be saved, the conference service costs can be reduced, and a better conference audio or video quality can also be ensured and the participant's service experience can be improved by reducing dependence on the bandwidth.

Furthermore, the embodiment of the present disclosure is compatible with existing service capabilities of a conference system. Therefore neither reconstruction of a networking solution nor reconstruction of a system architecture needs to be performed. The conference system can simultaneously convene an internal conference and a cross-system external conference, a conference terminal or the conference system does not need to provisionally modify the configuration, and no modification needs to be performed on service parameters such as a conference access number and a terminal number.

In the embodiment of the present disclosure, only interoperation between a conference system and an external network needs to be performed, and interoperation between an internal terminal of the conference system and the external network does not need to be performed, thereby better ensuring security of the conference system and implementing isolation of an internal network of an enterprise from an external network of the enterprise.

Figure 3:
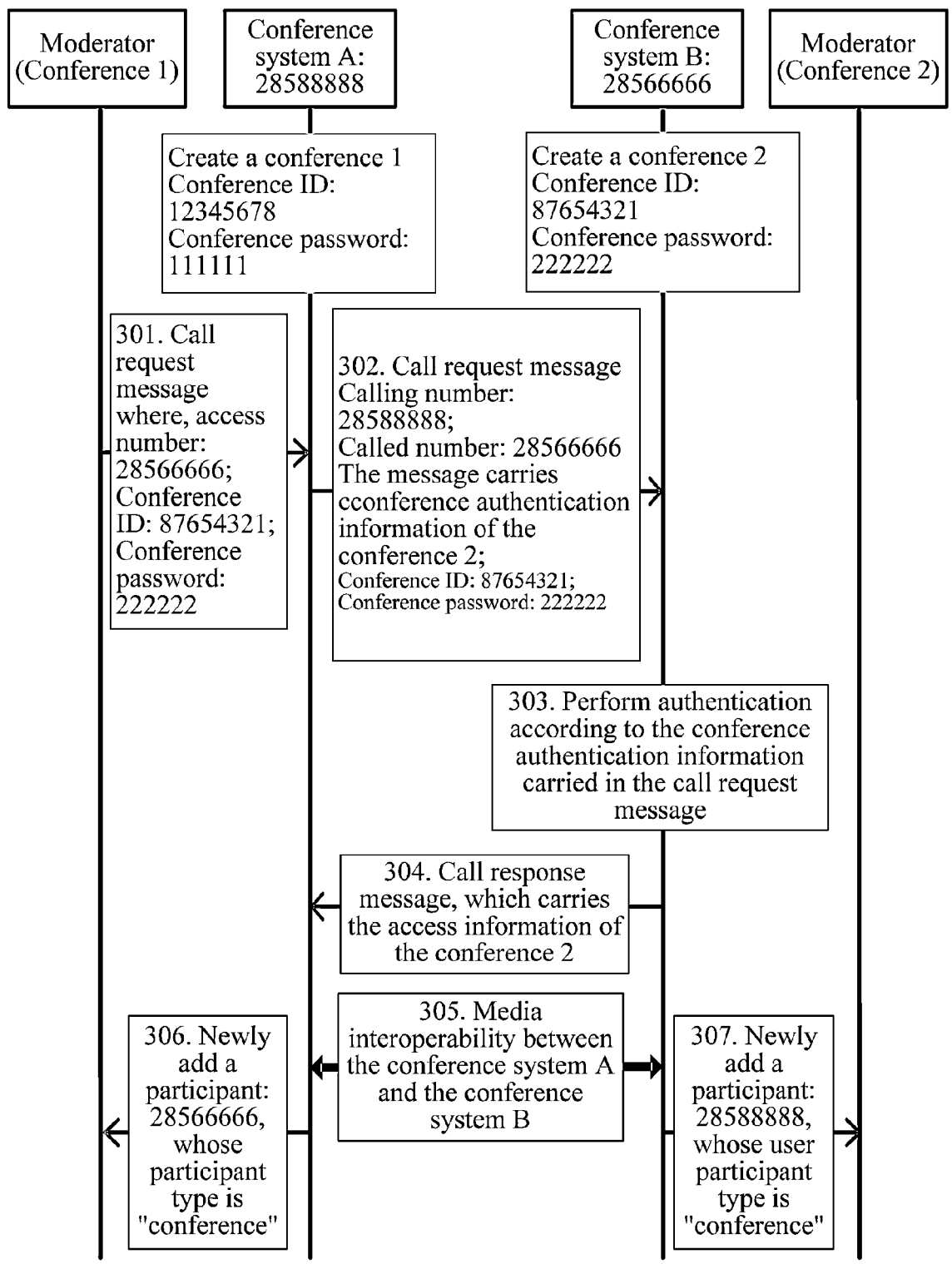
FIG. 3 is a flow chart of a method for interoperation between multiple conference systems according to another embodiment of the present disclosure.

With reference to FIG. 3, the following describes in detail an embodiment in which a conference system joins another conference system as a participant.

Likewise, before the method in the embodiment is executed, a conference moderator has created a conference. For example, a scheduled conference or an instant conference may be created. Alternatively, a list of participants may also be designated, where the participants are allowed to attend the conference. That is, a participant beyond the list of participants will be rejected when the participant attempts to attend the conference.

For example, a moderator of a conference system A creates a conference 1, and conference authentication information of the conference 1 may be a conference ID and a password, where the conference ID is 12345678, and the conference password is 111111. An access number of the conference system A is 28588888.

A moderator of a conference system B creates a conference 2, and conference authentication information of the conference 2 may be a conference ID and a password, where the conference ID is 87654321, and the conference password is 222222. An access number of the conference system B is 28566666.

It can be seen from FIG. 3 that the method, according to the embodiment of the present disclosure, may include the following steps:

301: On a conference control interface of the conference 1, the moderator of the conference 1 invites, using a call request message, "the conference 2" to attend the conference 1. On the conference control interface, the moderator enters information such as the access number of the conference 2, the conference ID of the conference 2 and the conference password of the conference 2.

302: The conference system A sends the call request message to the conference system B. The call request message includes but is not limited to a session initiation protocol (SIP) invite message. A calling number is the access number 28588888 of the conference 1, and a called number is the access number 285666666 of the conference 2. A Content-Type of the call request message may be a multipart/mixed type and is certainly not limited thereto. A BODY of the call request message includes not only session description protocol (SDP) information of the conference 1 but also the following information:

the conference authentication information of the conference 2, and the conference authentication information of the conference 2 may exemplarily include the conference ID, the conference password, and the like.

Alternatively, the call request message may further carry the conference authentication information of the conference 1. The conference authentication information of the conference 1 may exemplarily include the conference ID and the conference password, so that the conference system B initiates an authentication request to the conference system A according to the conference authentication information of the conference 1.

The preceding description may also be understood as that the call request message may further carry the conference authentication information of the conference system A, and the conference authentication information of the conference system A may exemplarily include the conference ID and the conference password, so that the conference system B initiates an authentication request to the conference system A according to the conference authentication information of the conference system A.

303: After receiving the call request message initiated by the conference system A, the conference system B not only performs audio or video media negotiation according to SDP information carried in the BODY but also authenticates the conference system A according to the conference authentication information of the conference 2 carried in the BODY.

304: After completing the media negotiation and the authentication, the conference system B returns a call response message to the conference system A. The call response message includes but is not limited to 200 OK. The Content-Type of the SIP message may be the multipart/mixed type and is certainly not limited thereto. The BODY of the call response message includes not only the SDP information of the conference 2 but also the access information of the conference 2, so that the conference system A accesses a conference control interface of the conference 2 according to the access information of the conference 2 and performs conference control over the conference 2. It may also be understood that the conference system A accesses the conference control interface of the conference system B according to the access information of the conference system B and performs conference control over the conference system B.

The access information of the conference 2 includes but is not limited to an access path of the conference control interface, such as a hypertext transfer protocol HTTP) uniform resource locator (URL).

Alternatively, the call response message may further carry a conference name of the conference system B, and when the conference system A adds the conference system B into a conference as a participant, a name for identifying the participant may be the conference name of the conference system B.

Alternatively, the call response message may further carry a language type of the conference system B, and when the conference system A adds the conference system B into a conference as a participant, a language used for playing a conference alert tone to the participant is a language indicated by the language type of the conference system B.

305: After completing the media negotiation, the conference system A and the conference system B add each other into a conference as a participant, and perform the media interoperation. In this embodiment, the conference 1 regards the conference 2 as a participant invited to join the conference 1, and the conference 2 regards the conference 1 as a participant actively dialing into the conference 2. In this case, the audio or video interoperation is implemented between the conference 1 and the conference 2, and the conference 1 and the conference 2 each are capable of hearing a voice of the peer participant and seeing a video of the peer participant.

306 and 307: On the conference control interface of the conference 1, the moderator of the conference 1 is capable of seeing a newly added participant in the list of participants, where a number of the newly added participant is 28566666, and the participant type of the newly added participant is "conference". On the conference control interface of the conference 2, the moderator of the conference 2 is capable of seeing a newly added participant in the list of participants, where a number of the newly added participant is 28588888, and the participant type of the newly added participant is "conference". Step 306 and step 307 are arranged in a random order.

Therefore, in the embodiment of the present disclosure, the first conference system may join the second conference system as a participant, thereby implementing interoperation between the first conference system and the second conference system and imposing no additional requirement on a terminal. Furthermore, in the embodiment of the present disclosure, audio or video media stream interoperation between two conferences can be implemented in need of only one call and without increasing bandwidth resources used for interoperation between multiple conference systems no matter how many participants accessing each conference. Therefore, in the embodiment of the present disclosure, a large number of bandwidth resources can be saved, the conference service costs can be reduced, and a better conference audio or video quality can also be ensured and the participant's service experience can be improved by reducing dependence on the bandwidth.

Furthermore, the embodiment of the present disclosure is compatible with existing service capabilities of a conference system. Therefore neither reconstruction of a networking solution nor reconstruction of a system architecture needs to be performed. The conference system can simultaneously convene an internal conference and a cross-system external conference, a conference terminal or the conference system does not need to provisionally modify the configuration, and no modification needs to be performed on service parameters such as a conference access number and a terminal number.

In the embodiment of the present disclosure, only interoperation between a conference system and an external network needs to be performed, and interoperation between an internal terminal of the conference system and the external network does not need to be performed, thereby better ensuring security of the conference system and implementing isolation of an internal network of an enterprise from an external network of the enterprise.

Figure 4:
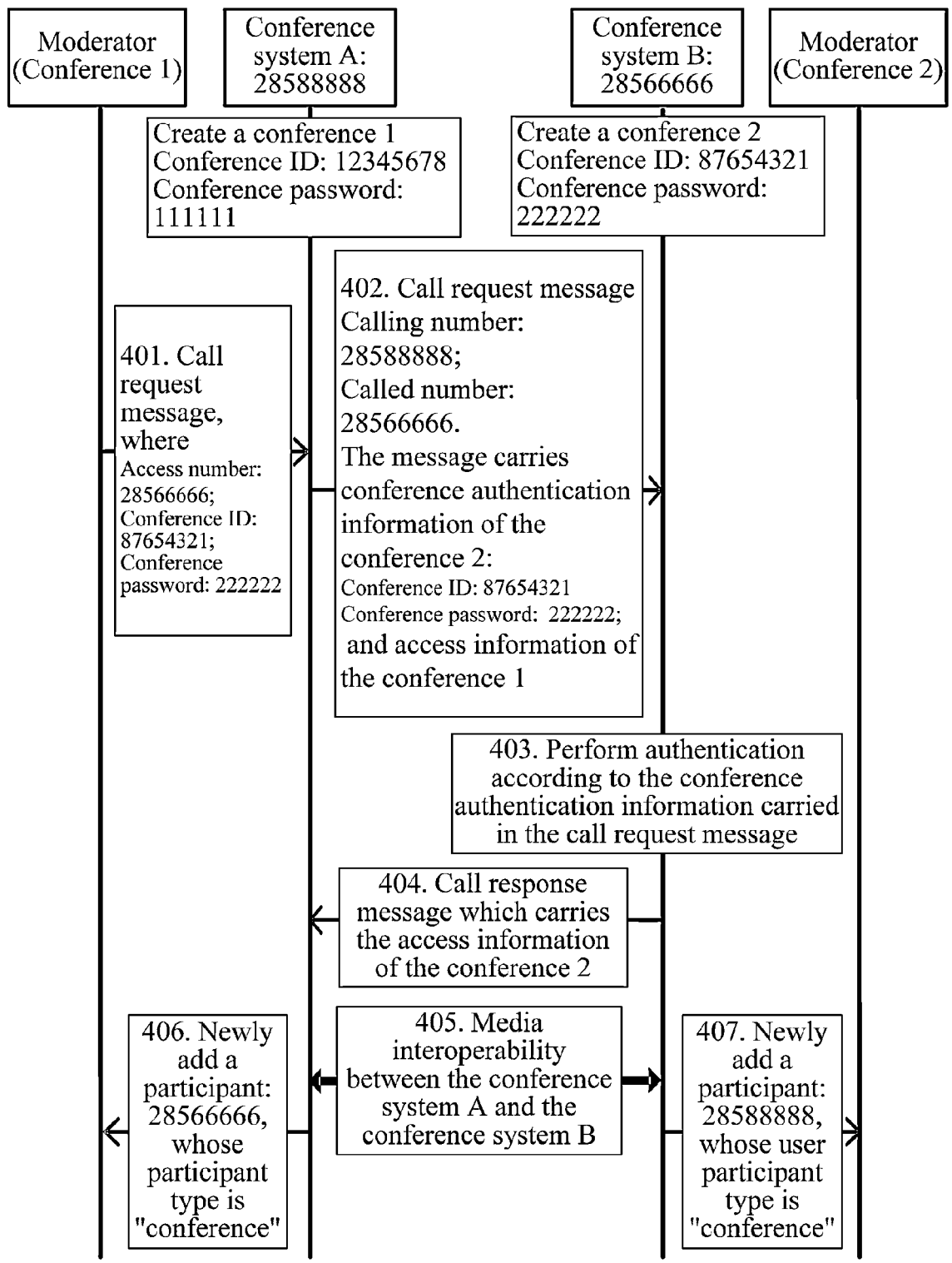
FIG. 4 is a flow chart of a method for interoperation between multiple conference systems according to still another embodiment of the present disclosure.

With reference to FIG. 4, the following describes in detail another embodiment in which a conference system joins another conference system as a participant.

For conference creation and step 401, reference is made to the description in the previous embodiment.

402: The conference system A sends the call request message to the conference system B. The call request message includes but is not limited to SIP INVITE. A calling number is the access number 28588888 of the conference 1, and a called number is the access number 285666666 of the conference 2. A Content-Type of the call request message may be a multipart/mixed type and is certainly not limited thereto. A BODY of the call request message includes not only the SDP information of the conference 1, and the conference authentication information of the conference 2 that includes the conference ID and the conference password, but also the access information of the conference 1, so that the conference system B sends an access request according to the access information, accesses the conference control interface of the conference 1, and performs conference control over the conference 1. It may also be understood that the BODY of the call request may carry the access information of the conference system A, so that the conference system B sends an access request according to the access information, accesses the conference control interface of the conference system A, and performs conference control over the conference system A.

The access information of the conference 1 or the conference system A includes but is not limited to an access path (for example, an HTTP URL) of the conference control interface.

Alternatively, the call request message may further carry the conference authentication information of the conference 1. The conference authentication information of the conference 1 includes the conference ID and the conference password, so that the conference system B initiates an authentication request to the conference system A according to the conference authentication information of the conference 1.

403: After receiving the call request message initiated by the conference system A, the conference system B not only performs audio or video media negotiation according to SDP information carried in the BODY but also authenticates the conference system A according to the conference authentication information of the conference 2 carried in the BODY. At the same time, the access information of the conference 1 carried in the BODY is recorded for use in a subsequent conference control operation.

404: After completing the media negotiation and the authentication, the conference system B returns a call response message to the conference system A. The call response message includes but is not limited to 200 OK. The Content-Type of the SIP message may be the multipart/mixed type and is certainly not limited thereto. The BODY of the call response message carries not only the SDP information of the conference 2 but also the access information of the conference 2, so that the conference system A accesses a conference control interface of the conference 2 according to the access information of the conference 2 and performs conference control over the conference 2. It may also be understood that the conference system A accesses the conference control interface of the conference system B according to the access information of the conference system B and performs conference control over the conference system B.

The access information of the conference 2 or the conference system B includes but is not limited to an access path (for example, an HTTP URL) of the conference control interface.

Alternatively, the call response message may further carry a conference name of the conference system B, and when the conference system A adds the conference system B into a conference as a participant, a name for identifying the participant may be the conference name of the conference system B.

Alternatively, the call response message may further carry a language type of the conference system B, and when the conference system A adds the conference system B into a conference as a participant, a language used for playing a conference alert tone to the participant is a language indicated by the language type of the conference system B.

405: After completing the media negotiation, the conference system A and the conference system B add each other into a conference as a participant, and perform the media interoperation. In this embodiment, the conference 1 regards the conference 2 as a participant invited to join the conference 1, and the conference 2 regards the conference 1 as a participant actively dialing into the conference 2. In this case, the audio or video interoperation is implemented between the conference 1 and the conference 2, and the conference 1 and the conference 2 each are capable of hearing a voice of the peer participant and seeing a video of the peer participant.

406 and 407: On the conference control interface of the conference 1, the moderator of the conference 1 is capable of seeing a newly added participant in the list of participants, where a number of the newly added participant is 28566666, and the participant type of the newly added participant is "conference". On the conference control interface of the conference 2, the moderator of the conference 2 is capable of seeing a newly added participant in the list of participants, where a number of the newly added participant is 28588888, and the participant type of the newly added participant is "conference". Step 406 and step 407 are arranged in a random order.

If the call request message in step 402 further carries the conference authentication information of the conference 1, the conference 1 and the conference 2 not only negotiate an audio or video media capability between them, but also know each other's conference authentication information and the access path of the conference control interface. In this case, according to the access path of the conference control interface of the conference 1 and the conference authentication information of the conference 1, the conference 2 can pass the authentication of the conference 1, access the conference control interface of the conference 1, and perform conference control over the conference 1. On the contrary, according to the access path of the conference control interface of the conference 2 and the conference authentication information of the conference 2, the conference 1 can pass the authentication of the conference 2, access the conference control interface of the conference 2, and perform conference control over the conference 2.

Therefore, in the embodiment of the present disclosure, the first conference system may join the second conference system as a participant, thereby implementing interoperation between the first conference system and the second conference system and imposing no additional requirement on a terminal. Furthermore, in the embodiment of the present disclosure, audio or video media stream interoperation between two conferences can be implemented in need of only one call and without increasing bandwidth resources used for interoperation between multiple conference systems no matter how many participants accessing each conference. Therefore, in the embodiment of the present disclosure, a large number of bandwidth resources can be saved, the conference service costs can be reduced, and a better conference audio or video quality can also be ensured and the participant's service experience can be improved by reducing dependence on the bandwidth.

Furthermore, the embodiment of the present disclosure is compatible with existing service capabilities of a conference system. Therefore neither reconstruction of a networking solution nor reconstruction of a system architecture needs to be performed. The conference system can simultaneously convene an internal conference and a cross-system external conference, a conference terminal or the conference system does not need to provisionally modify the configuration, and no modification needs to be performed on service parameters such as a conference access number and a terminal number.

In the embodiment of the present disclosure, only interoperation between a conference system and an external network needs to be performed, and interoperation between an internal terminal of the conference system and the external network does not need to be performed, thereby better ensuring security of the conference system and implementing isolation of an internal network of an enterprise from an external network of the enterprise.

Figure 5:
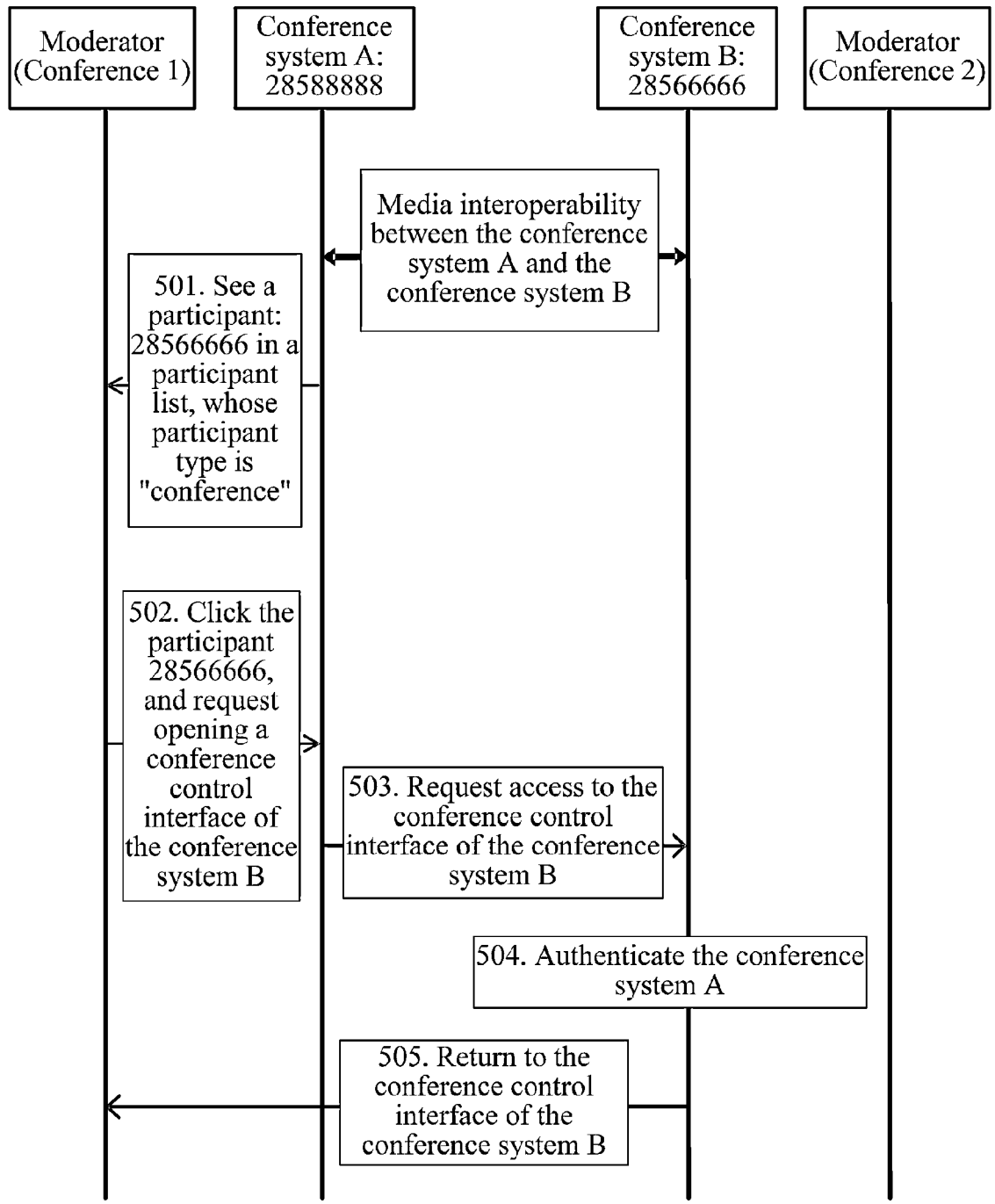
FIG. 5 is a flow chart of a method for inter-control between multiple conference systems according to yet another embodiment of the present disclosure.

The following describes an embodiment of inter-control between multiple conference systems with reference to FIG. 5.

In the aforementioned embodiments, an audio or video call is established between the conference 1 and the conference 2, and the conference 1 and the conference 2 each know each other's "conference" identity. Furthermore, alternatively, the conference 1 and the conference 2 may further know each other's conference ID, conference password, and access path of the conference control interface. A conference moderator may not only see a list of participants and identify a participant type of a peer through the conference control interface of the conference, but also request a click to open a conference control interface of a peer conference and control a participant of the peer conference.

Before the method in the embodiment is executed, the conference system A may alternatively record the conference authentication information of the conference 2 and the access information of the conference 2. Likewise, the conference system B may record the conference authentication information of the conference 1 and the access information of the conference 1.

501: On the conference control interface of the conference 1, the moderator of the conference 1 is capable of seeing, in the list of participants, a participant 28566666 that represents the conference 2 and whose participant type is "conference".

502: The moderator of the conference 1 clicks the participant 28566666 and request opening the conference control interface of the conference system B.

503: The conference system A requests accessing the conference control interface of the conference system B according to the obtained access path of the conference control interface of the conference system B, where an access request may carry the conference authentication information of the conference 2. The conference authentication information includes but is not limited to the conference ID, the conference password, and the like. Actually, the conference system A logs in to the conference control interface of the conference system B as a simulated user, and the login procedure is invisible to the user.

504: After receiving the access request of the conference system A, the conference system B authenticates the conference system A according to the conference authentication information of the conference 2 carried in the request and completes the login.

505: After the authentication is passed, the conference system B returns the conference control interface of the conference system B, so that the moderator of the conference 1 is capable of performing conference control over the conference system B, for example, managing a participant of the conference 2.

Alternatively, the moderator of the conference 2 may also access the conference control interface of the conference 1, and control a participant of the conference 1. The process and the method are similar to those in the preceding embodiment. The details will not be described herein again.

Therefore, in the embodiment of the present disclosure, not only interoperation between two or more conferences is implemented, but also inter-control between these conferences is supported. A moderator of any conference can identify which participant type is a conference in a current conference and can click on the conference control interface of the current conference to open conference control interfaces of other conferences and control the other conferences. Furthermore, alternatively, the moderator does not need to log in once again.

The preceding takes two conference systems as an example for illustration, and interoperation or inter-control between more than two conference systems is implemented in a similar manner. The details will not be described herein again.

The aforementioned embodiment takes adoption of the SIP protocol between two conference systems as an example for illustration, and the embodiment of the present disclosure may also be applied to interoperation between conference systems adopting the H.323 and inter-control between conference systems adopting the H.323. The method is similar, and the details will not be described herein again.

In the aforementioned embodiment, in the procedure that the conference system A calls the conference system B to implement interoperation or inter-control between multiple conferences, a signaling message may be encrypted to ensure communication security. For example, an SIP message may be encrypted through the session initiation protocol secure (SIPS).

In the aforementioned embodiment, the conference 1 and the conference 2 are separately located on two different conference systems. In another embodiment of the present disclosure, performing interoperation or inter-control between two or more conferences of a same conference system is also supported, and the implementation method is similar; in this case, the conference system A initiates a conference cascading call, and both a calling number and a called number are conference access numbers of this conference system.

In the embodiment of the present disclosure, not only interoperation or inter-control between two conference systems is supported, but also interoperation or inter-control between multiple conference systems can be supported; in the embodiment of the present disclosure, not only interoperation or inter-control between conference systems with a same media capability (such as interoperation between two high definition video conferences) is supported, but also interoperation or inter-control between conference systems with different media capabilities (such as interoperation between a standard definition video conference and a high definition video conference) is supported. In the embodiment of the present disclosure, not only conference interoperation or inter-control between different conference systems is supported, but also conference interoperation or inter-control within a same conference system is supported.

Figure 6:
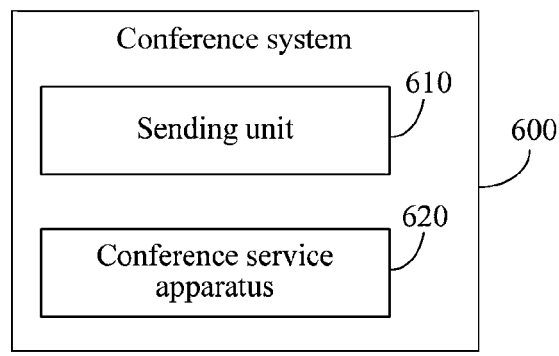
FIG. 6 is a schematic structural diagram of a conference system according to an embodiment of the present disclosure.

According to another embodiment of the present disclosure, a conference system is further proposed. FIG. 6 is a schematic structural diagram of a conference system 600. As shown in FIG. 6, the conference system 600 may include: a sending unit 610, configured to send a call request message to a second conference system, where the call request message carries conference authentication information of the second conference system, so that the second conference system authenticates the conference system according to the conference authentication information; and a conference service apparatus 620, configured to add, after the authentication is passed, the conference system into the second conference system as a participant, where a type of the participant is a conference.

Alternatively, the call request message may further carry conference authentication information of the conference system, so that the second conference system initiates an authentication request to the conference system according to the conference authentication information of the conference system.

Alternatively, when the call request message further carries access information of the conference system, the conference service apparatus 620 is further configured to receive an access request that is sent by the second conference system according to the access information and provide a conference control interface for the second conference system.

Therefore, in the embodiment of the present disclosure, the conference system joins the second conference system as a participant, thereby implementing interoperation between the conference system and the second conference system and imposing no additional requirement on a terminal.

Furthermore, in the embodiment of the present disclosure, audio or video media stream interoperation between two conferences can be implemented in need of only one call and without increasing bandwidth resources used for interoperation between multiple conference systems no matter how many participants accessing each conference. Therefore, in the embodiment of the present disclosure, a large number of bandwidth resources can be saved, the conference service costs can be reduced, and a better conference audio or video quality can also be ensured and the participant's service experience can be improved by reducing dependence on the bandwidth.

Furthermore, the embodiment of the present disclosure is compatible with existing service capabilities of a conference system. Therefore neither reconstruction of a networking solution nor reconstruction of a system architecture needs to be performed. The conference system can simultaneously convene an internal conference and a cross-system external conference, a conference terminal or the conference system does not need to provisionally modify the configuration, and no modification needs to be performed on service parameters such as a conference access number and a terminal number.

In the embodiment of the present disclosure, only interoperation between a conference system and an external network needs to be performed, and interoperation between an internal terminal of the conference system and the external network does not need to be performed, thereby better ensuring security of the conference system and implementing isolation of an internal network of an enterprise from an external network of the enterprise.

Figure 7:
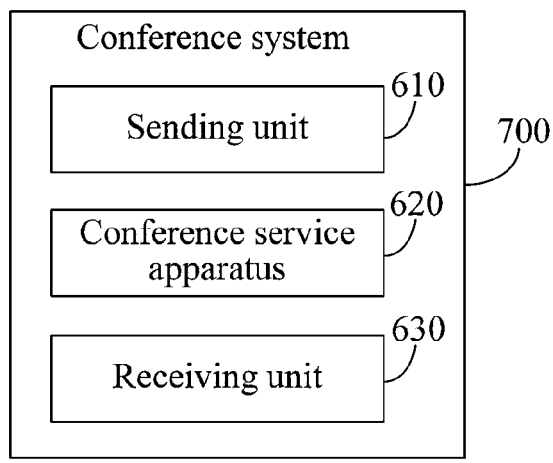
FIG. 7 is a schematic structural diagram of a conference system according to another embodiment of the present disclosure.

According to another embodiment of the present disclosure, a conference system is further proposed. FIG. 7 is a schematic structural diagram of a conference system 700. As shown in FIG. 7, the conference system 700 may further include a receiving unit 630 except for the sending unit 610 and the conference service apparatus 620 that are shown in FIG. 6. The receiving unit 630 is configured to receive a call response message sent by the second conference system, where the call response message carries access information of the second conference system, so that the conference system accesses a conference control interface of the second conference system according to the access information of the second conference system and performs conference control over the second conference system.

Alternatively, the call response message received by the receiving unit 630 may further carry a conference name of the second conference system, and when the conference system adds the second conference system into a conference as a participant, a name for identifying the participant is the conference name of the second conference system.

Alternatively, the call response message received by the receiving unit 630 may further carry a language type of the second conference system, and when the conference system adds the second conference system into a conference as a participant, a language used for playing a conference alert tone to the participant is a language indicated by the language type of the second conference system.

Therefore, in the embodiment of the present disclosure, not only interoperation between two or more conferences is implemented, but also inter-control between these conferences is supported. A moderator of any conference can identify which participant type is a conference in a current conference and can click on the conference control interface of the current conference to open conference control interfaces of other conferences and control the other conferences. Furthermore, alternatively, the moderator does not need to log in once again.

Figure 8:
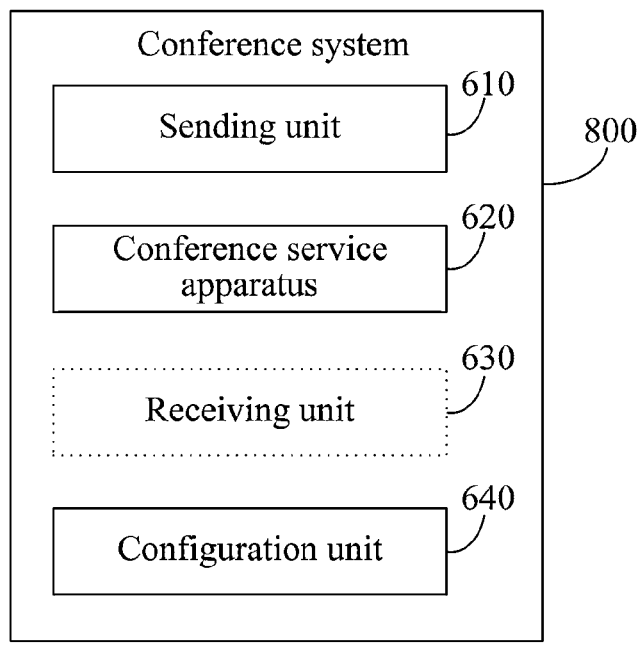
FIG. 8 is a schematic structural diagram of a conference system according to still another embodiment of the present disclosure.

According to another embodiment of the present disclosure, a conference system is further proposed. As shown in FIG. 8, a conference system 800 may further include a configuration unit 640 except for the sending unit 610 and the conference service apparatus 620 that are shown in FIG. 6. The configuration unit 640 is configured to pre-configure access information of a second conference system on the conference system, so that the conference system accesses a conference control interface of the second conference system according to the access information of the second conference system and performs conference control over the second conference system. Alternatively, a receiving unit 630 may be further included. The receiving unit 630 is configured to receive a call response message sent by the second conference system, where the call response message may carry a conference name of the second conference system, and when the conference system adds the second conference system into a conference as a participant, a name for identifying the participant is the conference name of the second conference system.

Alternatively, the call response message received by the receiving unit 630 may further carry a language type of the second conference system, and when the conference system adds the second conference system into a conference as a participant, a language used for playing a conference alert tone to the participant is a language indicated by the language type of the second conference system.

Likewise, in the embodiment of the present disclosure, not only interoperation between two or more conferences is implemented, but also inter-control between these conferences is supported. A moderator of any conference can identify which participant type is a conference in a current conference and can click on the conference control interface of the current conference to open conference control interfaces of other conferences and control the other conferences. Furthermore, alternatively, the moderator does not need to log in once again.

The solutions of the present disclosure are not limited thereto, and persons skilled in the art can fully think of implementing the solutions of the present disclosure in other manners. In addition, the aforementioned functional modules are merely logically divided, may also be further divided into more subsystems according to specific implementation, and may also be set in a combined or separated manner on a physical entity without influencing the essence of the present disclosure.

It can be understood that mutual reference may be made to related features in the foregoing method and device. In addition, "first", "second", and the like in the foregoing embodiments are used to distinguish between the embodiments rather than representing superiority or inferiority of the embodiments.

A person of ordinary skill in the art may appreciate that, in combination with the examples described in the embodiments disclosed in this specification, units and algorithm steps may be implemented by electronic hardware, computer software, or a combination thereof. In order to clearly describe the interchangeability between the hardware and the software, the foregoing has generally described compositions and steps of every embodiment according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and units, reference may be made to the corresponding process in the foregoing method embodiments, and the details will not be described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit are implemented in a form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in a form of a software product. The computer software product is stored in a storage medium and includes several instructions for instructing a computer device (which may be a personal computer, a server, or a network device) to perform all or a part of the steps of the methods described in the embodiments of the present disclosure. The foregoing storage medium includes: any medium that can store a program code, such as a USB flash disk, a removable hard disk, a read-only memory (ROM), a random access memory (RAM), a magnetic disk, or an optical disk.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for interoperation between a first conference system and a second conference system which are associated with a first conference and a second conference, respectively, the method comprising:
sending, by the first conference system, a call request message to the second conference system, wherein the call request message includes conference authentication information of the second conference created by the second conference system for authentication;
after the authentication is passed, joining, by the first conference system, the second conference as a participant, wherein a type of the participant is a conference;
receiving, by the first conference system, an access request associated with access information of the first conference created by the first conference system from the second conference system; and
providing, by the first conference system, a conference control interface of the first conference for the second conference system.

2. The method according to claim 1, further comprising:
receiving, by the first conference system, a call response message from the second conference system, wherein the call response message includes access information of the second conference;
accessing, by the first conference system, a conference control interface of the second conference according to the access information of the second conference; and
performing, by the first conference system, conference control over the second conference.

3. The method according to claim 1, wherein the first conference system includes access information of the second conference configured thereon, and the method further comprises:
accessing, by the first conference system, a conference control interface of the second conference according to the access information of the second conference; and
performing, by the first conference system, conference control over the second conference.

4. The method according to claim 2, wherein the access information of the second conference comprises: an access path of the conference control interface of the second conference.

5. The method according to claim 1, wherein the call request message further includes conference authentication information of the first conference.

6. The method according to claim 2, wherein the call response message further includes a conference name of the second conference, and the method further comprises:
adding, by the first conference system, the second conference system into the first conference as a participant, wherein a name for identifying the second conference system is the conference name of the second conference.

7. The method according to claim 2, wherein the call response message further includes a language type of the second conference, and the method further comprises:
adding, by the first conference system, the second conference system into the first conference as a participant, wherein language used for playing a conference alert tone to the second conference system is indicated by the language type of the second conference.

8. A first conference system, comprising:
a sending unit, configured to send a call request message to a second conference system, wherein the call request message includes conference authentication information of a second conference created by the second conference system for authentication; and
a conference service apparatus, configured to add, after the authentication is passed, the first conference system into the second conference as a participant, wherein a type of the participant is a conference;
wherein the conference service apparatus is further configured to receive an access request associated with access information of a first conference created by the first conference system from the second conference system and provide a conference control interface of the first conference for the second conference system.

9. The first conference system according to claim 8, further comprising a receiving unit, wherein the receiving unit is configured to receive a call response message from the second conference system, wherein the call response message includes access information of the second conference; and the first conference system is further configured to access a conference control interface of the second conference according to the access information of the second conference, and perform conference control over the second conference.

10. The first conference system according to claim 9, wherein the call response message received by the receiving unit further includes a conference name of the second conference, wherein when the first conference system adds the second conference system into the first conference as a participant, a name for identifying the second conference system is the conference name of the second conference.

11. The first conference system according to claim 9, wherein the call response message received by the receiving unit further includes a language type of the second conference, wherein when the first conference system adds the second conference system into the first conference as a participant, language used for playing a conference alert tone to the second conference system is indicated by the language type of the second conference.

12. The first conference system according to claim 8, further comprising a configuration unit, wherein the configuration unit is configured to pre-configure access information of the second conference on the first conference system; and the first conference system is further configured to access a conference control interface of the second conference according to the access information of the second conference and perform conference control over the second conference.

13. The first conference system according to claim 8, wherein the call request message further includes conference authentication information of the first conference.

14. A non-transitory computer readable medium in a first conference system associating with a first conference, wherein the computer readable medium has processor-executable instructions stored thereon, which when executed causes a processor in the first conference system to implement the following:

sending, a call request message to a second conference system associating with a second conference, wherein the call request message includes conference authentication information of the second conference created by the second conference system for authentication;

after the authentication is passed, joining, the second conference as a participant, wherein a type of the participant is a conference;

receiving, an access request associated with access information of the first conference created by the first conference system from the second conference system; and providing, a conference control interface of the first conference for the second conference system.

15. The non-transitory computer readable medium according to claim 14, wherein the processor is further configured to implement:

receiving, a call response message from the second conference system, wherein the call response message includes access information of the second conference;

accessing, a conference control interface of the second conference according to the access information of the second conference; and performing, conference control over the second conference.

16. The non-transitory computer readable medium according to claim 14, wherein the first conference system includes access information of the second conference configured thereon, and the processor is further configured to implement:

accessing, a conference control interface of the second conference according to the access information of the second conference; and performing, conference control over the second conference.

17. The non-transitory computer readable medium according to claim 15, wherein the access information of the second conference comprises: an access path of the conference control interface of the second conference.

18. The non-transitory computer readable medium according to claim 14, wherein the call request message further includes conference authentication information of the first conference.

19. The non-transitory computer readable medium according to claim 15, wherein the call response message further includes a conference name of the second conference, and the processor is further configured to implement:

adding, the second conference system into the first conference as a participant, wherein a name for identifying the second conference system is the conference name of the second conference.

20. The non-transitory computer readable medium according to claim 15, wherein the call response message further includes a language type of the second conference, and the processor is further configured to implement:

adding, the second conference system into the first conference as a participant, wherein language used for playing a conference alert tone to the second conference system is indicated by the language type of the second conference.

* * * * *